United States Patent
Varma et al.

(10) Patent No.: US 12,321,714 B2
(45) Date of Patent: Jun. 3, 2025

(54) COMPRESSED WALLACE TREES IN FMA CIRCUITS

(71) Applicant: Intel Corporation, Santa Clara, CA (US)

(72) Inventors: Aditya Varma, Noida (IN); Mahesh Kumashikar, Bangalore (IN); Michael Espig, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 17/358,722

(22) Filed: Jun. 25, 2021

(65) Prior Publication Data
US 2022/0365751 A1   Nov. 17, 2022

(30) Foreign Application Priority Data

May 14, 2021   (IN) .............................. 202141021768

(51) Int. Cl.
*G06F 7/53*   (2006.01)
*G06F 7/502*  (2006.01)
*G06F 17/16*  (2006.01)

(52) U.S. Cl.
CPC ............ *G06F 7/5318* (2013.01); *G06F 7/502* (2013.01); *G06F 7/5312* (2013.01); *G06F 17/16* (2013.01)

(58) Field of Classification Search
CPC ........ G06F 7/483; G06F 7/487; G06F 7/4876; G06F 7/501; G06F 7/502; G06F 7/5443; G06F 7/52; G06F 7/523; G06F 7/5277; G06F 7/53; G06F 7/5306; G06F 7/5312; G06F 7/5318; G06F 7/5324; G06F 17/16; G06F 2207/3816; G06F 2207/3824; G06F 2207/3892; G06F 2207/3884

See application file for complete search history.

(56) References Cited

U.S. PATENT DOCUMENTS

| | | | | |
|---|---|---|---|---|
| 7,433,912 | B1 * | 10/2008 | Jagodik | G06F 7/5324 708/628 |
| 9,848,188 | B1 * | 12/2017 | Cismas | G06F 17/147 |
| 10,037,189 | B2 * | 7/2018 | Langhammer | G06F 7/4876 |
| 2009/0287757 | A1 * | 11/2009 | Rarick | G06F 7/483 708/523 |
| 2012/0151191 | A1 * | 6/2012 | Boswell | G06F 7/5324 712/222 |
| 2014/0188968 | A1 * | 7/2014 | Kaul | G06F 7/5443 708/501 |
| 2021/0011686 | A1 * | 1/2021 | Makino | G06F 7/5324 |

* cited by examiner

*Primary Examiner* — Andrew Caldwell
*Assistant Examiner* — Huy Duong
(74) *Attorney, Agent, or Firm* — Essential Patents Group, LLP

(57) ABSTRACT

An embodiment of an apparatus comprises one or more fractional width fused multiply-accumulate (FMA) circuits configured as a shared Wallace tree, and circuitry coupled to the one or more fractional width FMA circuits to provide one or more fractional width FMA operations through the one or more fractional width FMA circuits. Other embodiments are disclosed and claimed.

21 Claims, 14 Drawing Sheets

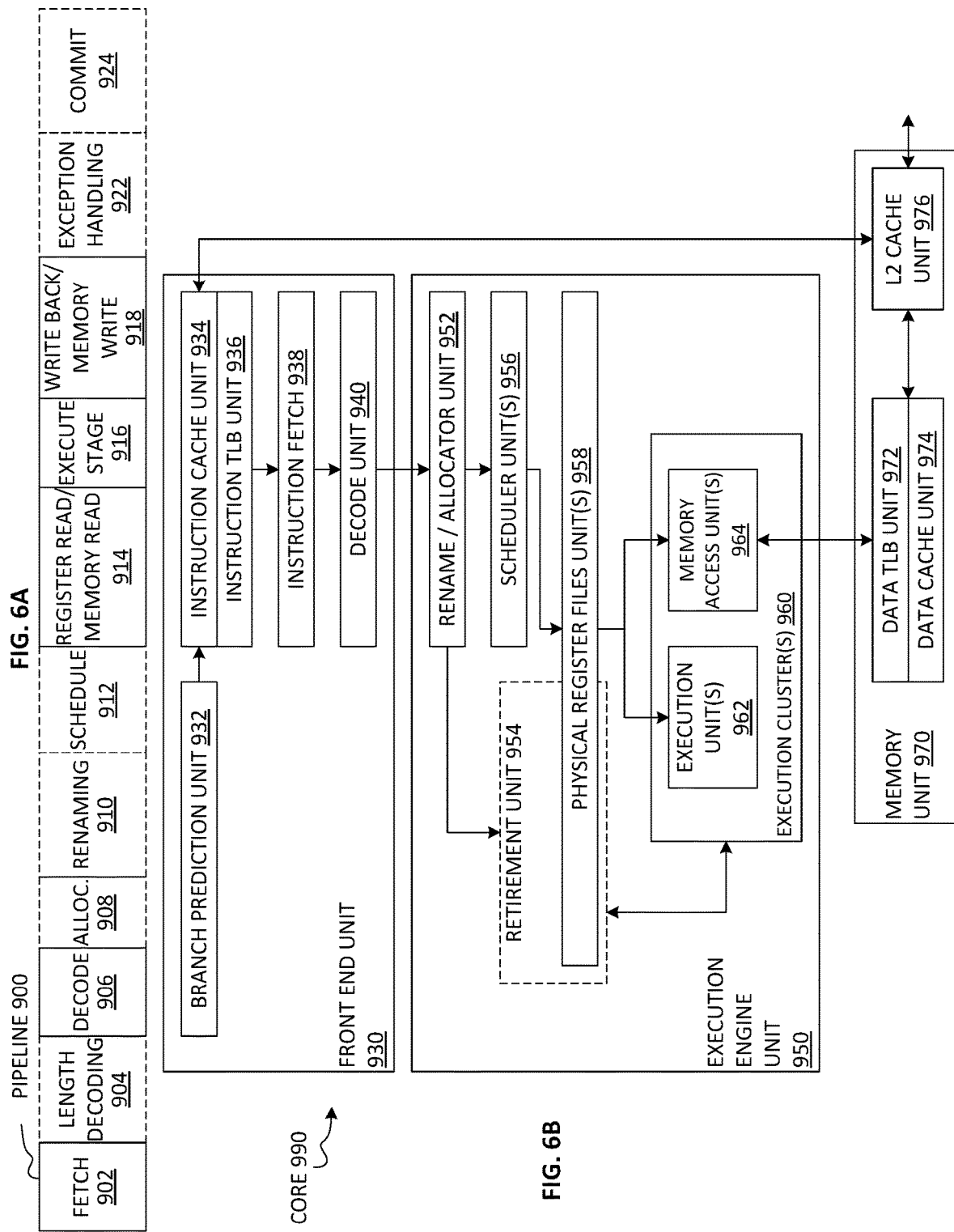

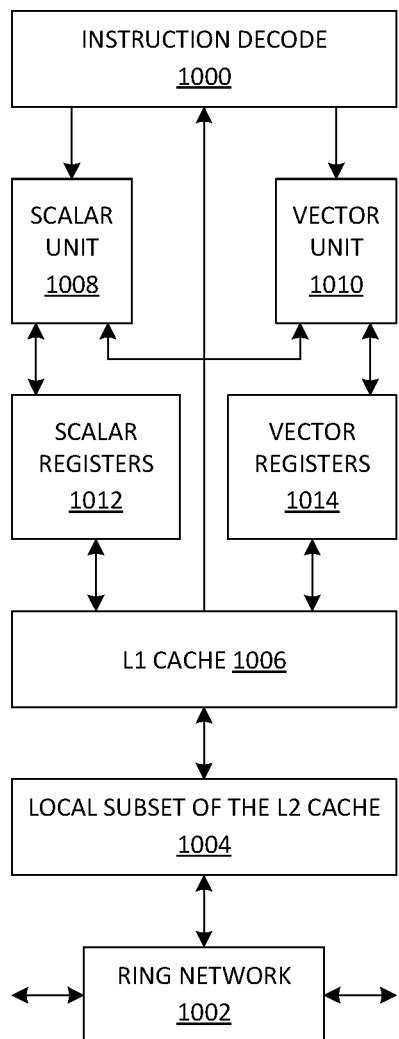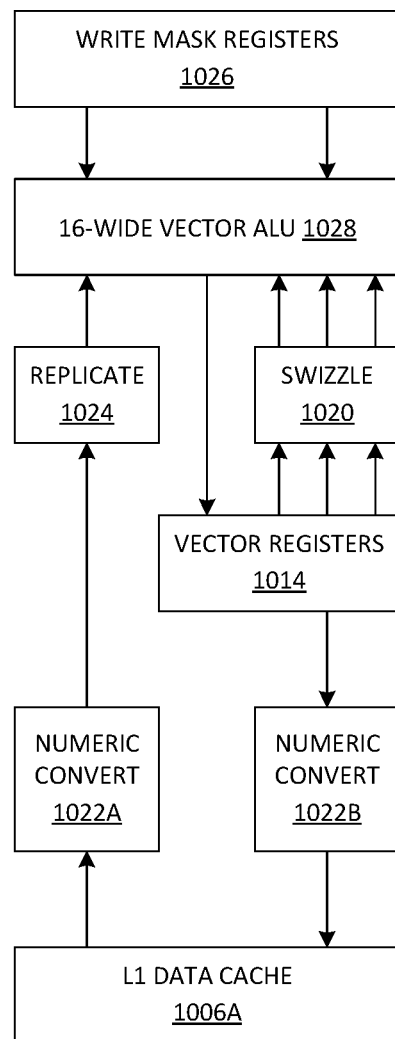
FIG. 7A
FIG. 7B

COMPRESSED WALLACE TREES IN FMA CIRCUITS

CLAIM FOR PRIORITY

This application claims priority to India Provisional Patent Application No. 202141021768, filed May 14, 2021 and titled "COMPRESSED WALLACE TREES IN FMA CIRCUITS," which is incorporated by references in its entirety for all purposes.

BACKGROUND

1. Technical Field

This disclosure generally relates to fused multiply-add (FMA) technology, and more particularly to FMA technology for use with systolic arrays.

2. Background Art

In computing, especially with a digital signal processor (DSP), the multiply-accumulate operation is a common step that computes the product of two numbers and adds that product to an accumulator. The hardware unit that performs the operation is known as a multiplier-accumulator (MAC, or MAC unit). The operation itself is also often called a MAC or a MAC operation. The MAC operation modifies an accumulator a as follows: a=a+(b×c). When done with floating point numbers, a MAC operation might be performed with two roundings (typical in many DSPs), or with a single rounding. When performed with a single rounding, the MAC operation may be referred to as a fused multiply-add (FMA), or sometimes also referred to as a fused multiply-accumulate (also FMA).

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention;

FIG. 6B is a block diagram illustrating both an exemplary embodiment of an in-order architecture core and an exemplary register renaming, out-of-order issue/execution architecture core to be included in a processor according to embodiments of the invention;

FIGS. 7A-B illustrate a block diagram of a more specific exemplary in-order core architecture, which core would be one of several logic blocks (including other cores of the same type and/or different types) in a chip;

DETAILED DESCRIPTION

Figure 1:
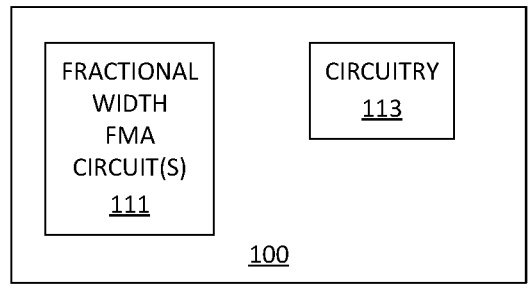
FIG. 1 is a block diagram of an example of an integrated circuit according to an embodiment.

Embodiments discussed herein variously provide techniques and mechanisms for a FMA unit. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide FMA units for use with systolic arrays.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for compressed Wallace trees in fused multiply-accumulate (FMA) circuits. The recent development of neural networks supporting artificial intelligence (AI) has resulted in the industry utilizing systolic arrays of FMA units to support the associated large matrix to matrix multiplication problems. Most of these array architectures are designed to support multiple datatypes in order to maximize their applicability across training and inference as well as the breadth of neural network types. These architectures typically overload each FMA unit to be capable of executing two or more of the supported datatypes. However, this results in a sub-optimal utilization of the FMA units when processing datatypes less than the maximum supported datatype width due to unused gates in the implementation.

Some embodiments provide technology to build an FMA targeted for systolic array implementations. Some embodiments double the throughput of the smaller width datatype as compared to a conventional dual-datatype FMA architecture without a linear increase in circuit area (e.g., which may increase by 1.2-1.5× instead of 2×). Because embodiments are targeted for systolic array implementations, embodiments also deliver the same throughput for the maximum width datatype.

Some conventional approaches integrate two half-width datatype units into a full-width FMA unit. For example, a single double-precision FMA unit will typically be capable of executing two single-precision FMA operations. These designs are based on conventional standalone designs that provided half-width execution throughput at 2× the full-width throughput.

Because the conventional approaches were utilized in environments where the latency of a single full-width FMA operation was critical, the integration of the half-width datatypes was constrained to be integrated within the existing circuitry and could not impact timing through the design when operating in either mode. This resulted in approximately half of the circuits being unused when executing half-width FMA operations.

In some embodiments, an integrated circuit may include circuitry configured to provide a compressed shared Wallace Tree design for a FMA unit. For example, the circuitry may pack two half-width FMAs (e.g., implemented with cascaded carry-save adders (CSAs)) within the Wallace tree (e.g., in a highly efficient manner). Embodiments may be configured to support two half-width operations per cycle and/or half of a full-width operation per cycle. By utilizing a FMA unit configured as described herein in a systolic architecture, embodiments deliver sufficient throughput for the full-width operation and 2× the half-width throughput.

Advantageously, embodiments may deliver double the throughput of half-width datatypes for general matrix multiplication (GEMM) systolic arrays. Conventional approaches support 32-bit floating point (FP32) and some form of float-16 datatypes. Embodiments may advantageously deliver 2× performance in 1.2×-1.5× the silicon area for neural networks that may be dominated by large GEMM operations. Embodiments also advantageously reduce leakage power when operating in half-width mode due to removal of unused gates.

Embodiments are not constrained to only half-width support. Embodiments of the compressed shared Wallace Tree technology described herein may be configured to support quarter-width or smaller datatype implementations. Embodiments may provide multiple passes through a fractional-width FMA circuit as needed to support the full width FMA operations (e.g., or double-width FMA operations, etc.). Although examples provided herein are sometimes described in connection with usage in a systolic array, embodiments are not so limited. Embodiments may be utilized as a stand-alone FMA unit or other, more heterogeneous architectures.

With reference to FIG. 1, an embodiment of an apparatus 100 may include one or more fractional width FMA circuit(s) 111 configured as a shared Wallace tree, and circuitry 113 coupled to the one or more fractional width FMA circuit(s) 111 to provide one or more fractional width FMA operations through the one or more fractional width FMA circuit(s) 111. In some embodiments, the one or more fractional width FMA circuit(s) 111 may comprise two or more fractional width FMA circuits that together may provide a full width FMA circuit.

In some embodiments, the one or more fractional width FMA circuit(s) 111 may comprise a first set of cascaded carry-save adders (CSAs) that provide a first half-width FMA circuit, and a second set of cascaded CSAs that provide a second half-width FMA circuit. For example, with the first and second half-width FMA circuits, the circuitry 113 may be configured to provide two half-width FMA operations per cycle, and/or to provide half of a full width FMA operation per cycle. In some embodiments, the circuitry 113 may be further configured to provide two passes through the first and second half-width FMA circuits to perform a full width FMA operation. Alternatively, or additionally, the apparatus 100 may further include a second pair of half-width FMA circuits coupled sequentially to the first and second half-width FMA circuits, and the circuitry 113 may be configured to provide a full width FMA operation per cycle in a pipelined manner through the first and second half-width FMA circuits followed by the second pair of half-width FMA circuits.

Figure 2A:
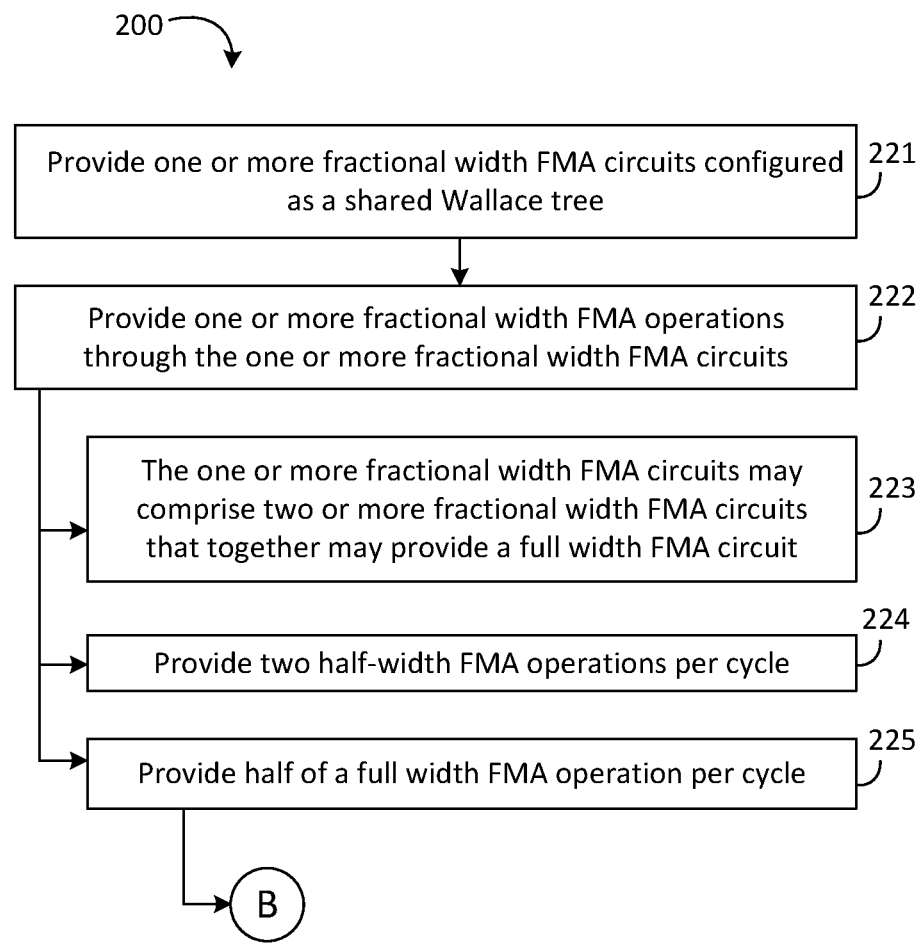
FIGS. 2A to 2B are flow diagrams of an example of a method according to an embodiment.
Figure 2B:
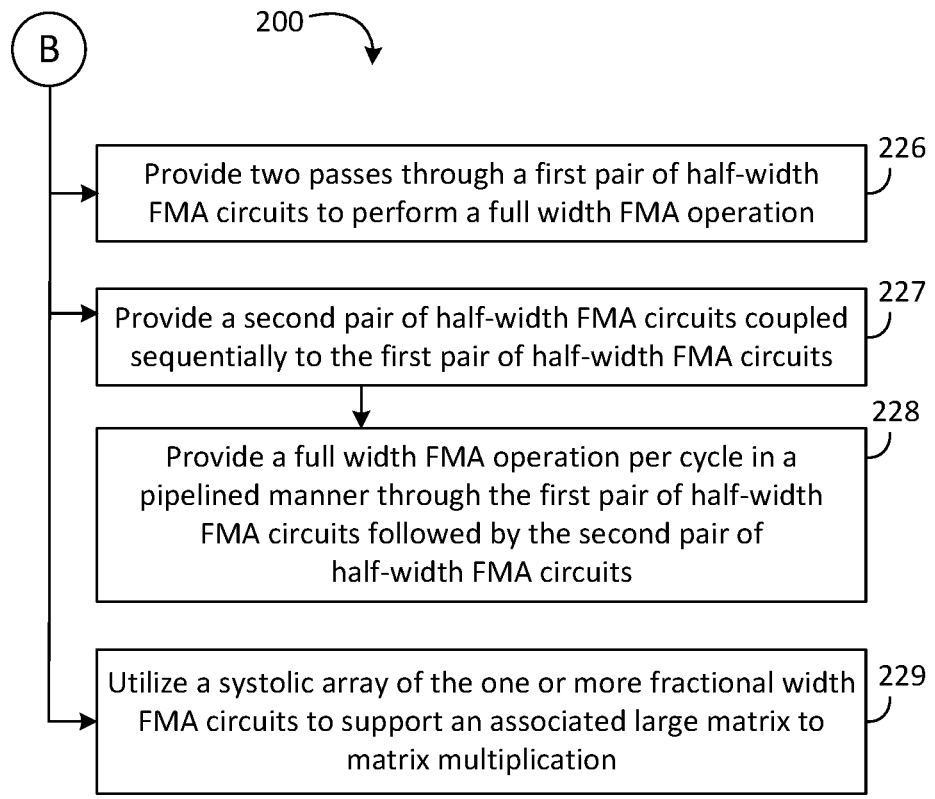

With reference to FIGS. 2A to 2B, an embodiment of a method 200 may include providing one or more fractional width FMA circuits configured as a shared Wallace tree at box 221, and providing one or more fractional width FMA operations through the one or more fractional width FMA circuits at box 222. In some embodiments, the one or more fractional width FMA circuits may comprise two or more fractional width FMA circuits that together may provide a full width FMA circuit at box 223. Some embodiments of the method 200 may further include providing two half-width FMA operations per cycle at box 224, and/or providing half of a full width FMA operation per cycle at box 225. For example, the method 200 may include providing two passes through a first pair of half-width FMA circuits to perform a full width FMA operation at box 226. Alternatively, or additionally, the method 200 may include providing a second pair of half-width FMA circuits coupled sequentially to the first pair of half-width FMA circuits at box 227, and providing a full width FMA operation per cycle in a pipelined manner through the first pair of half-width FMA circuits followed by the second pair of half-width FMA circuits at box 228. Some embodiments of the method 200 may further include utilizing a systolic array of the one or more fractional width FMA circuits to support an associated large matrix to matrix multiplication at box 229.

In some embodiments, an apparatus may include a processor core, a memory, and circuitry coupled to the processor core and the memory, where the circuitry is configured to provide a compressed shared Wallace Tree design for a FMA unit. For example, the circuitry may pack two half-width carry-save adders (CSAs) within the Wallace Tree (e.g., in a highly efficient manner), and may be configured to support two half-width operations per cycle and half of a full-width operation per cycle.

Embodiments of a FMA unit may reside in any suitable location in a computer system/architecture, including inside or outside a processor core boundary. For example, embodiments of FMA circuits described herein may be included on accelerators (e.g., a vector processing unit (VPU), a graphics processing unit (GPU), etc.) which may reside outside of the processor core boundary.

Figure 3A:
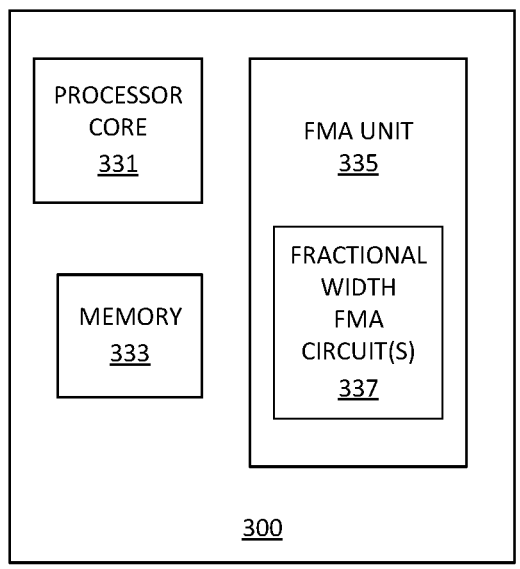
FIGS. 3A and 3B are block diagrams of respective examples of an apparatus according to an embodiment.

With reference to FIG. 3A, an embodiment of an apparatus 300 may include a processor core 331, a memory 333, and a FMA unit 335 coupled to the processor core 331 and the memory 333. The FMA unit 335 may comprise one or more fractional width FMA circuits 337 configured as a shared Wallace tree, and the FMA unit 335 may be configured to provide one or more fractional width FMA operations through the one or more fractional width FMA circuits 337. In some embodiments, the one or more fractional width FMA circuits 337 may comprise two or more fractional width FMA circuits that together provide a full width FMA circuit. FIG. 3A shows an example of where the FMA unit 335 resides outside the boundary of the processor core 331.

For example, the one or more fractional width FMA circuits 337 may comprise a first set of cascaded CSAs that provide a first half-width FMA circuit, and a second set of cascaded CSAs that provide a second half-width FMA circuit, and the FMA unit 335 may be configured to provide two half-width FMA operations per cycle, and/or to provide half of a full width FMA operation per cycle. To perform the full width FMA operation, the FMA unit 335 may be configured to provide two passes through the first and second half-width FMA circuits. Alternatively, or additionally, the FMA unit 335 may include a second pair of half-width FMA circuits coupled sequentially to the first and second half-width FMA circuits, the FMA unit 335 may be configured to provide a full width FMA operation per cycle in a pipelined manner through the first and second half-width FMA circuits followed by the second pair of half-width FMA circuits.

Embodiments of the processor 331 may have any useful architecture. Suitable examples of the processor 331 include the core 990 (FIG. 7B), the cores 1102A-N (FIGS. 9, 13), the processor 1210 (FIG. 7), the co-processor 1245 (FIG. 10), the processor 1370 (FIGS. 11-12), the processor/coprocessor 1380 (FIGS. 11-12), the coprocessor 1338 (FIGS. 11-12), the coprocessor 1520 (FIG. 13), and/or the processors 1614, 1616 (FIG. 17).

Figure 3B:
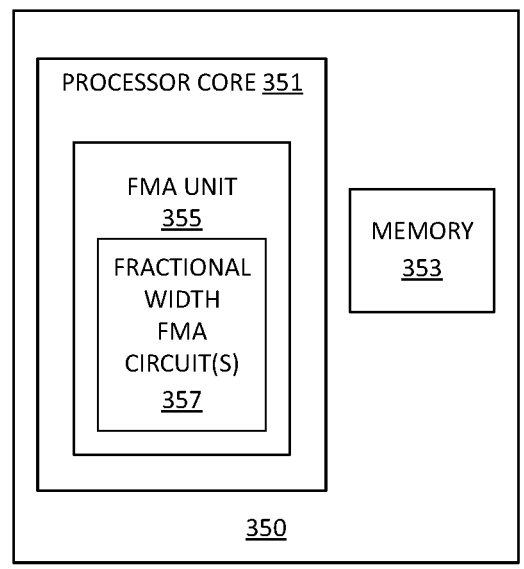

With reference to FIG. 3B, an embodiment of an apparatus 350 may include a processor core 351 coupled to a memory 353. The processor core 351 includes a FMA unit 355 integrated therewith. The FMA unit 355 may comprise one or more fractional width FMA circuits 357 configured as a shared Wallace tree, and the FMA unit 355 may be configured to provide one or more fractional width FMA operations through the one or more fractional width FMA circuits 357. For example, the FMA unit 355 and FMA circuits 357 may otherwise be similarly configured as the FMA unit 335 and the FMA circuits 357. FIG. 3B shows an example of where the FMA unit 355 resides inside the boundary of the processor core 351.

Embodiments of the processor 351 may have any useful architecture. Suitable examples of the processor 351 include the core 990 (FIG. 7B), the cores 1102A-N (FIGS. 9, 13), the processor 1210 (FIG. 7), the co-processor 1245 (FIG. 10), the processor 1370 (FIGS. 11-12), the processor/coprocessor 1380 (FIGS. 11-12), the coprocessor 1338 (FIGS. 11-12), the coprocessor 1520 (FIG. 13), and/or the processors 1614, 1616 (FIG. 17).

To provide a more efficient FMA unit, some embodiments configure a FMA unit capable of supporting a partial (half-pass) full-width FMA operation and two half-width FMA operations. For example, example FMA operations may include a half-pass double-precision operation combined with two single-precision operations, a half-pass single-precision operation combined with two half-precision operations, or any other similar combinations. Some embodiments may additionally or alternatively be configured to support quarter-width operations in a full-width unit with similar non-linear speedups.

Some conventional approaches include full-width CSAs configured for full-width FMA operations, where a full-width FMA operation (e.g., double precision in this case) contains two half-width FMAs (e.g., single precision). In the conventional approach, many of the gates of the cascaded CSAs are un-used gates during a half-width operation.

Embodiments of a FMA unit may be based on a compressed shared Wallace Tree design that packs two half-width Wallace trees tightly while allowing simultaneous operation. The half-pass full-width Wallace Tree is constructed on top of the two half-width trees. Because of this, additional carry-kill and bypass circuitry is integrated in order to prevent carry signal propagation from one half-width tree to the other, instead bypassing to subsequent levels of the Wallace tree. In full-width mode, the carry signals flow between the trees as part of normal operation.

Figure 4A:
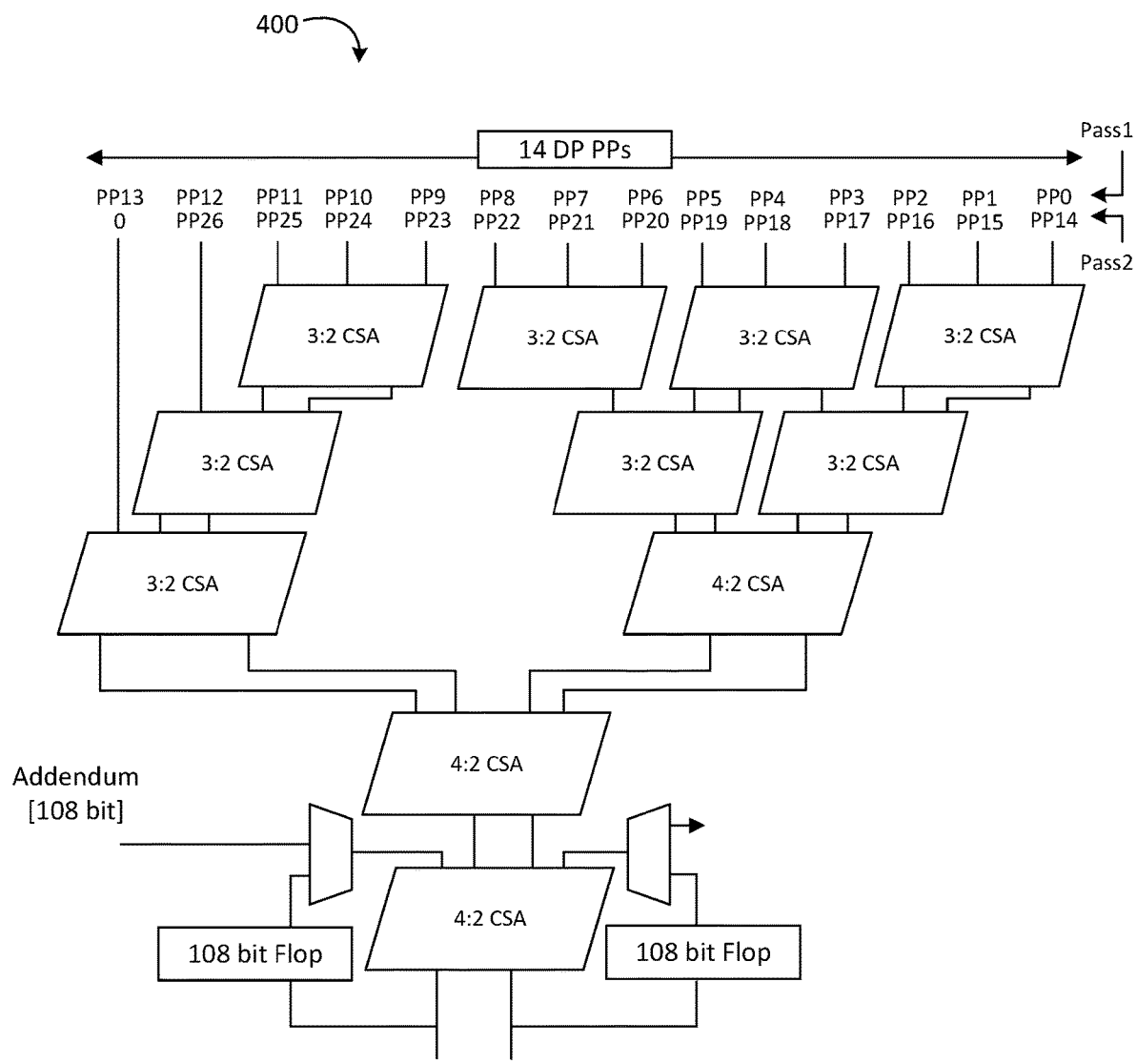
FIGS. 4A to 4C are illustrative diagrams of two compressed half-width fused multiply-accumulate (FMA) circuits contained in partial full-width FMA, according to embodiments.
Figure 4B:
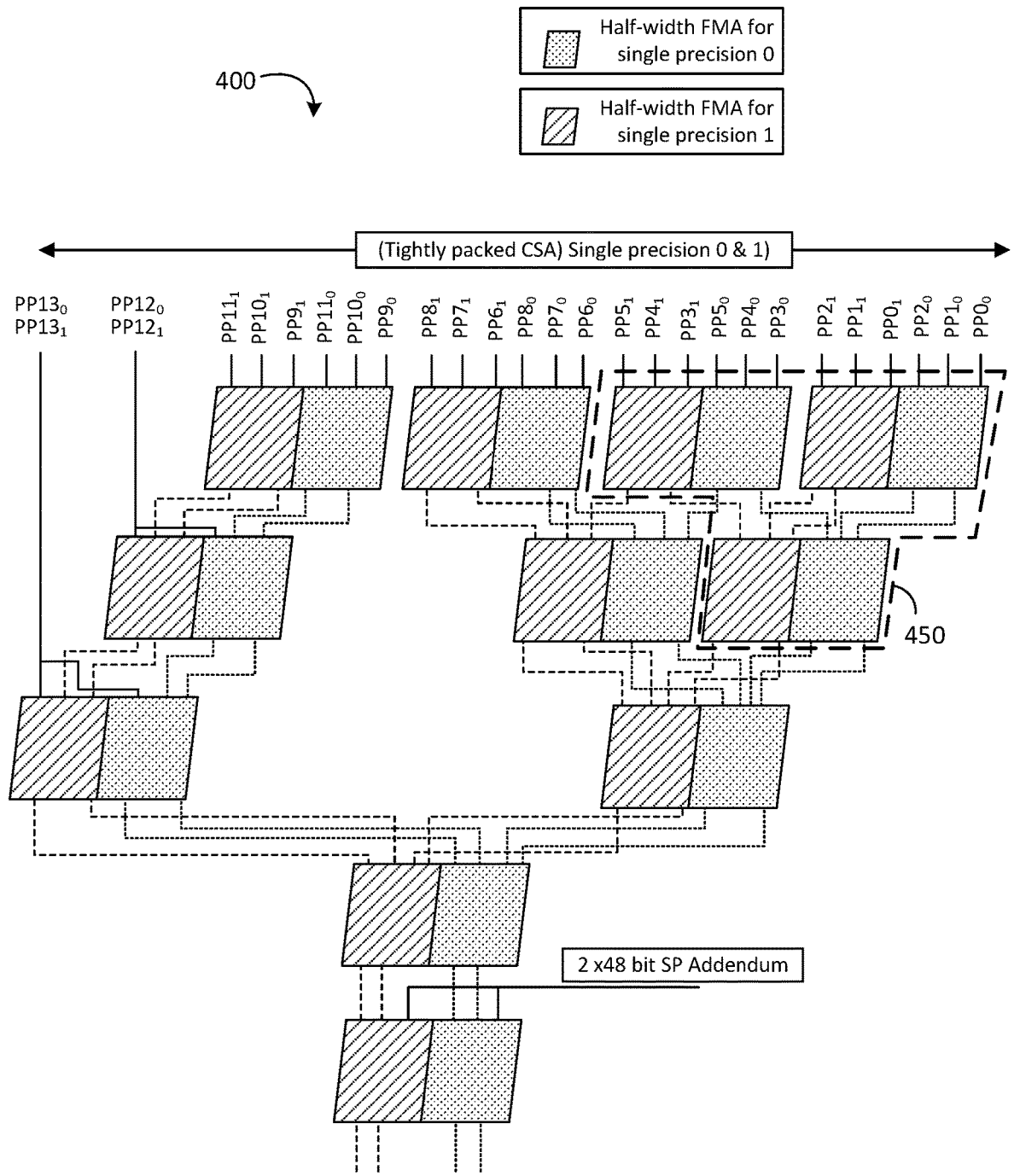
Figure 4C:
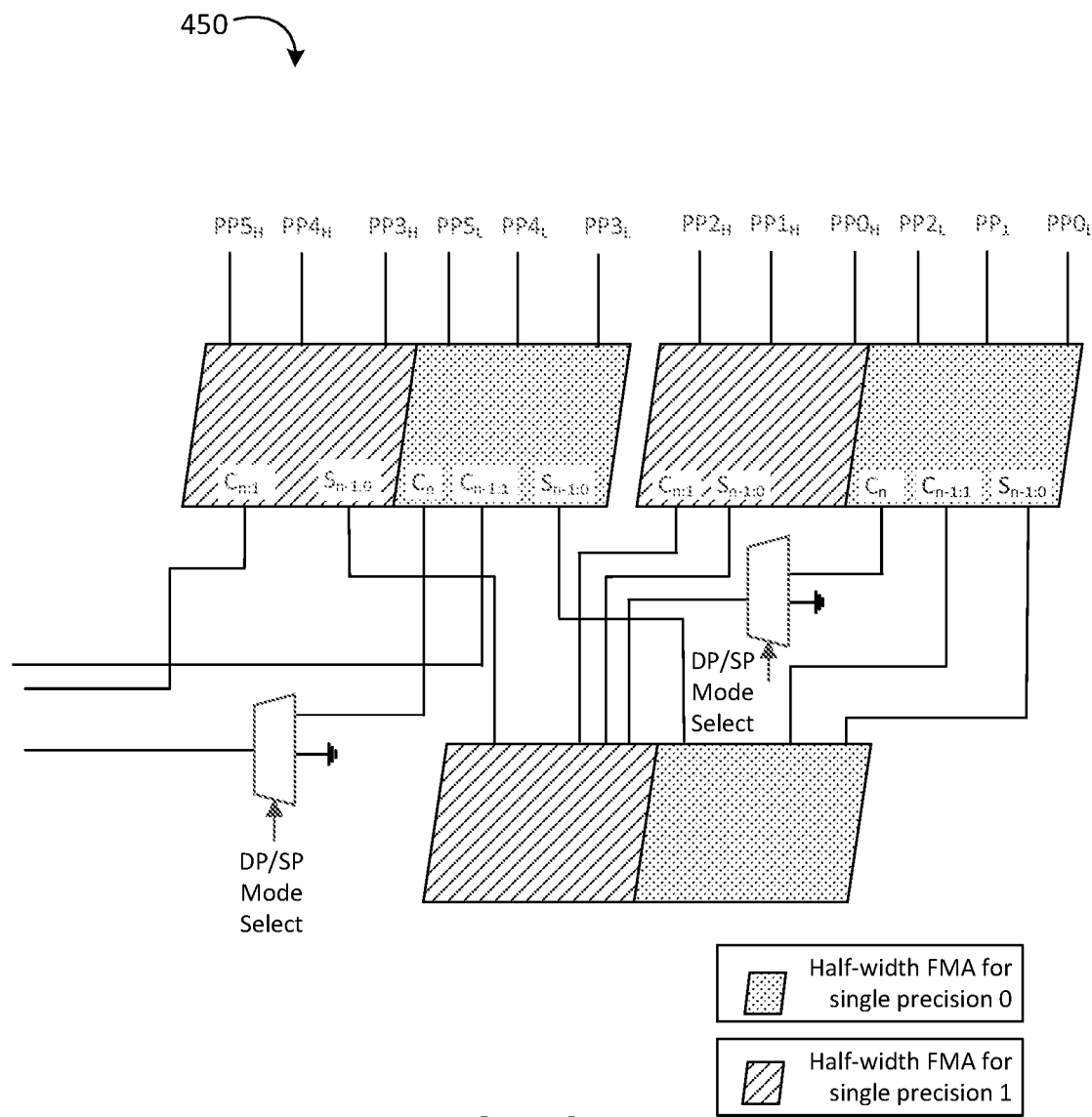

With reference to FIGS. 4A to 4C, an embodiment of a partial/half-pass full-width FMA unit 400 includes two half-width FMA circuits tightly packed (e.g., compressed) together contained in the partial full width FMA unit 400. The FMA unit 400 includes 4:2 CSAs, 3:2 CSAs, 108 bit Flip-flops, and multiplexers (muxes), coupled as shown. FIG. 4B shows how the FMA unit 400 may configure the CSAs as of first set of cascaded CSAs for a first half-width FMA circuit for single precision 0, and a second set of cascaded CSAs for a second half-width FMA circuit for single precision 1. In this embodiment, the FMA unit 400 supports fourteen (14)-bit double-precision (DP) partial products (PPs) with two passes. A first pass, labeled as Pass1, may output PP0 through PP13. A second pass, labeled as Pass2, may output PP14 through PP26. In this example, there are 27 PPs, hence the PP27, the $28^{th}$ PP is a zero (0). The two flip-flops and muxes are configured to support carry-kill and bypass operations to prevent carry signal propagation. FIG. 4C illustrates how a pair of half width CSAs may be packed together (e.g., see the highlighted portion 450 of the FMA unit 400). In the paired half width mode, the carry kill will suppress the carry to propagate from the lower half-width CSA to the upper one, allowing two independent half width computations to execute in parallel. In the full width mode, the upper and lower CSAs will be combined together to form a full width CSA. To achieve this the carry kill mux will be disabled to allow the carry to propagate from the lower half width CSA to the upper half width CSA. In some practical applications (e.g., a systolic array for an AI application), the two half-width FMA Wallace tree implementation only occasionally require the carry-kill and bypass signals.

In order to support the full-width operation, it is necessary to either (a) perform a two-pass operation on the partial full-width FMA unit or (b) chain two of the partial full-width FMA units together. In both cases the associated latency will be twice that of a monolithic FMA design. However, in a systolic environment, latency is of secondary importance as multiple FMAs are typically chained together and throughput performance is the main objective. The additional latency will be amortized across the depth of the systolic array and will be negligible given depths are often 16 levels or higher (e.g., additional 1/depth latency). Therefore, while both approaches are viable, embodiments may be especially applicable in systolic array architectures.

Figure 5:
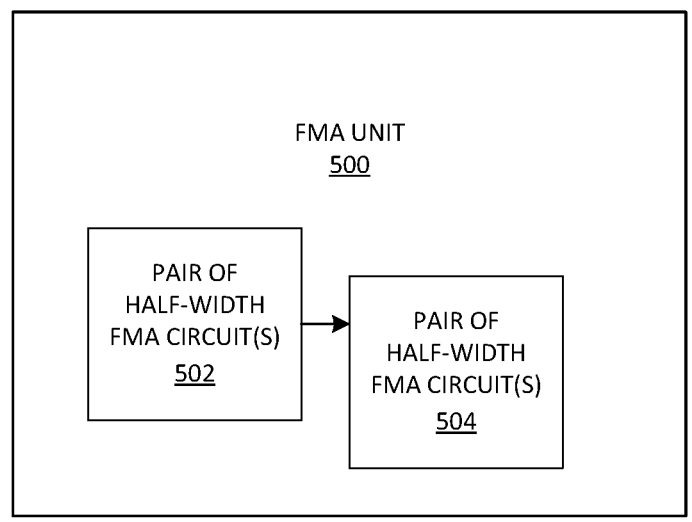
FIG. 5 is a block diagram of an example of a FMA unit according to an embodiment.

With reference to FIG. 5, an embodiment of a FMA unit 500 may include a first pair of half-width FMA circuits 502 coupled to a second pair of half-width FMA circuits 504 in a pipelined arrangement. For example, the FMA circuits 502 and 504 may be similarly configured as the half-width FMA unit 400, but without the carry-kill and bypass circuits utilized for multi-pass operations. The diagram is fine and sufficient to illustrate systolic compute.

In the chained approach, the compressed Wallace trees are connected in consecutive pipe stages. In the half-width case, the first pipe stage performs the multiplication of the first two half-width operands and feeds the results as an addendum to the next pipe stage which performs the multiplication of the next two half-width operands, effectively delivering two back-to-back FMA operations. In full-width mode, the first stage collapses half of the partial products and feeds them to the second stage containing the second half of the partial products, resulting in a single full-width FMA operation.

The area savings for this approach is obtained by reducing the number of partial products which scale with the width of the maximum implemented datatype. In the current approach the number of partial products is a function of the width (generally the number of partial products is expressed as {NumPP=(width/2)+1}. By splitting the monolithic FMA into two parts and compressing the half-width FMA contained within, this is reduced by a factor of ~2×. While the total area of the full-width FMA solution increases because of the split (e.g., about 1.2×-1.5×), the number of half-width FMAs is doubled. While this approach is scalable for precision widths, it is important to note that the area savings decreases as embodiments are applied to smaller datatype widths. This is due to the "depth" of the partial product tree decreasing in a logarithmic fashion as datatype width decreases, thereby reducing the number of unused gates in the Wallace Tree for the smaller datatype. In addition, the leakage power associated with the unused gates will be eliminated when operating in half-width mode.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 6B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
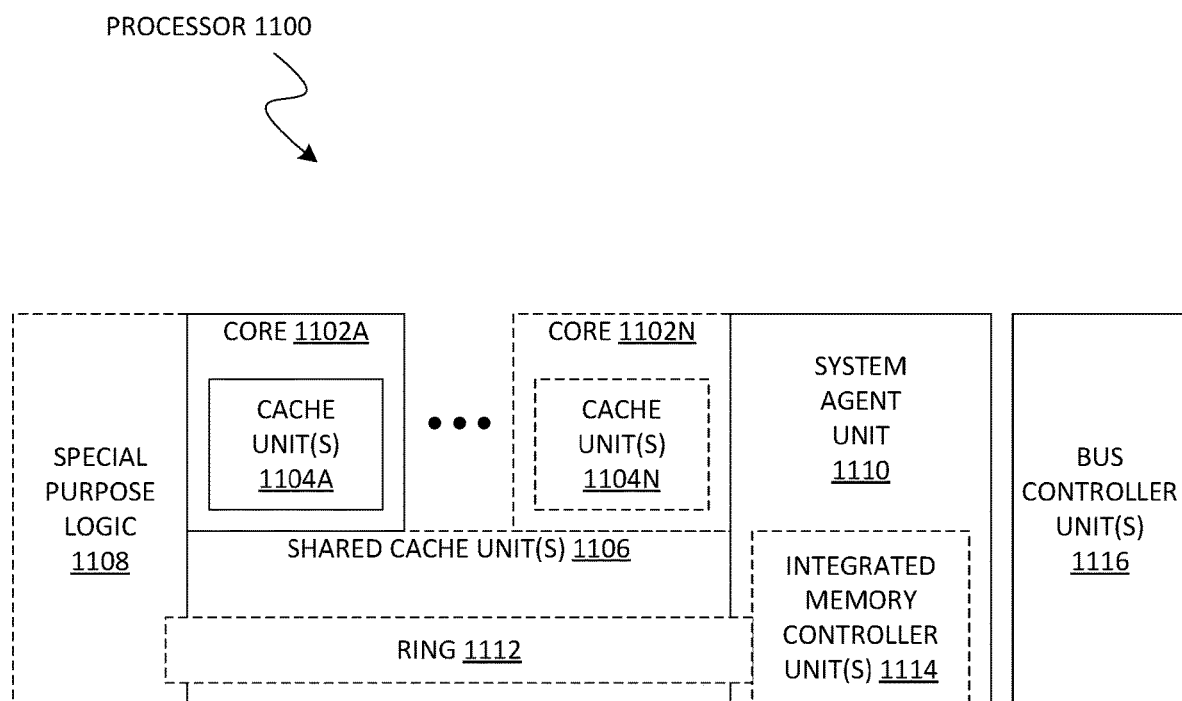
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
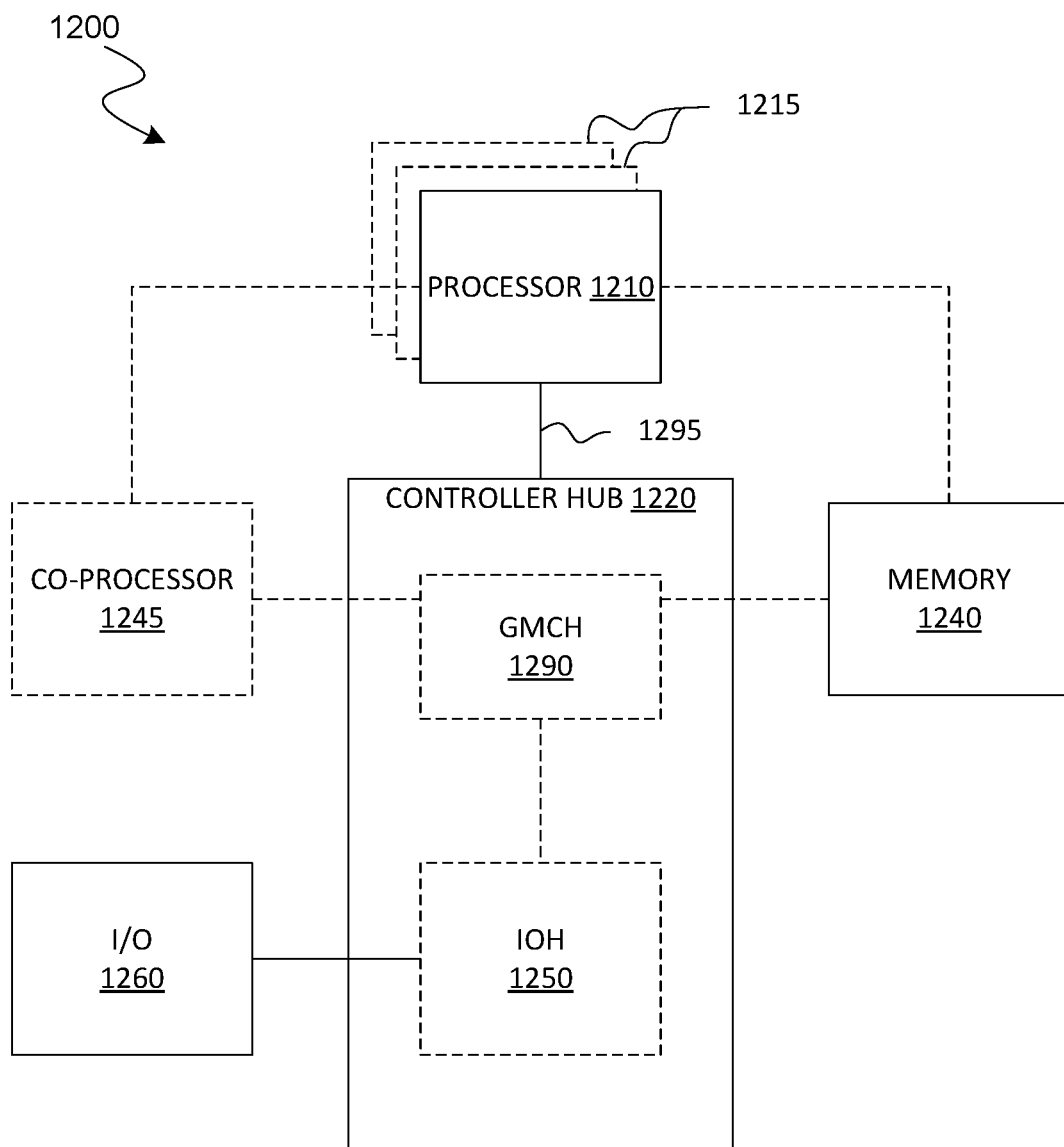
FIGS. 9-12 are block diagrams of exemplary computer architectures.

Referring now to FIG. 9, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
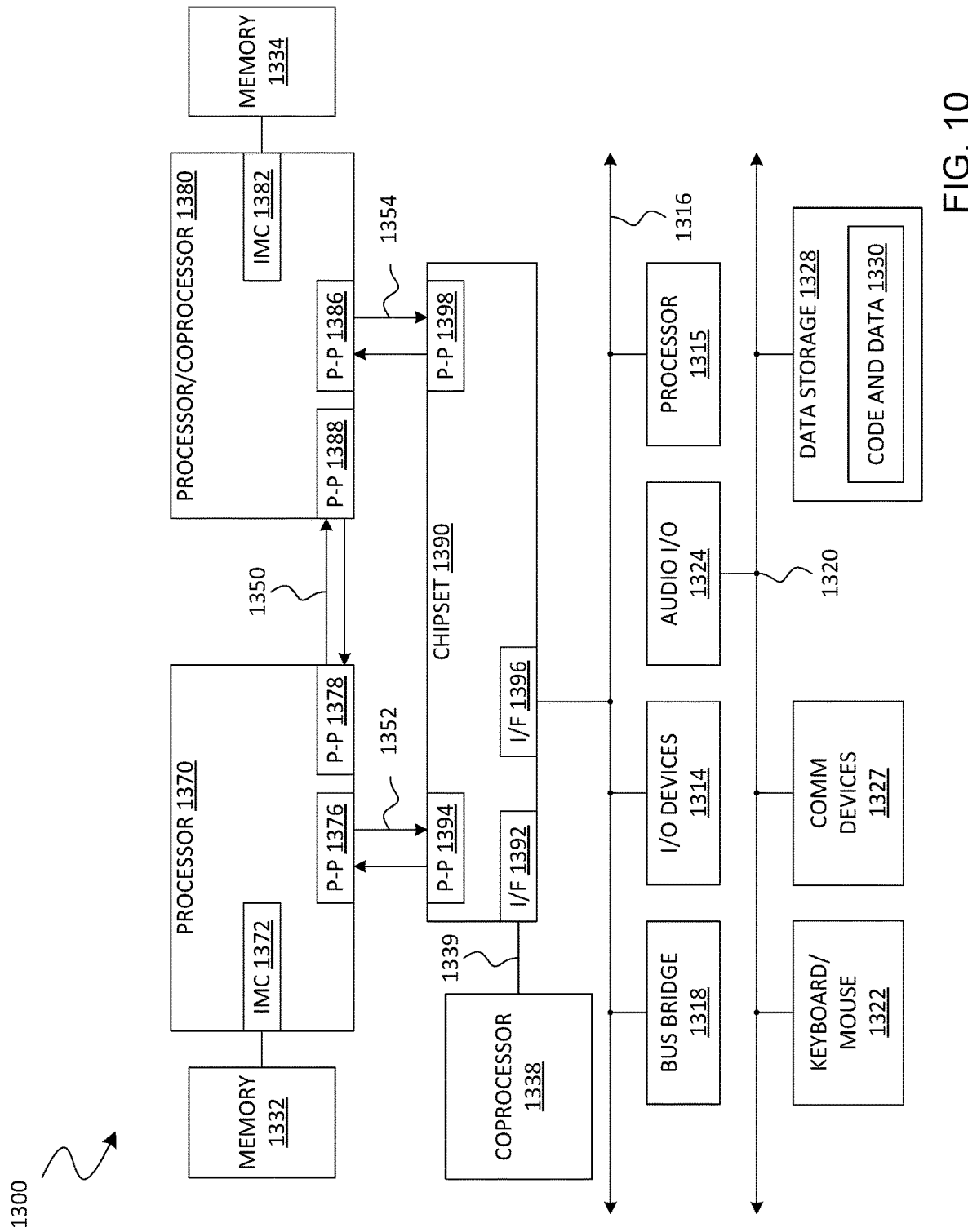

Referring now to FIG. 10, shown is a block diagram of a first more specific exemplary system 1300 in accordance with an embodiment of the present invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

Figure 11:
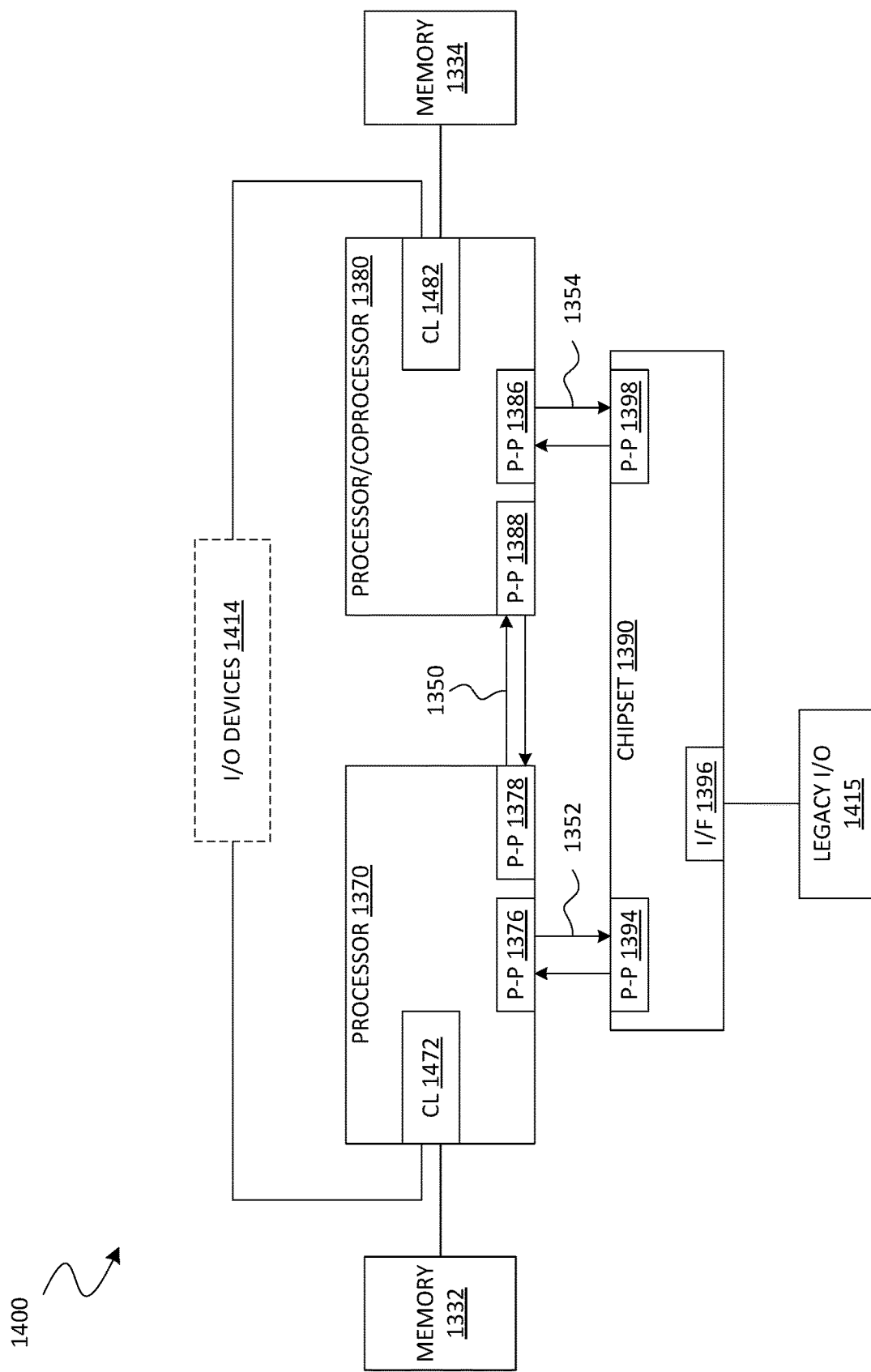

Referring now to FIG. 11, shown is a block diagram of a second more specific exemplary system 1400 in accordance with an embodiment of the present invention Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1472 and 1482, respectively. Thus, the CL 1472, 1482 include integrated memory controller units and include I/O control logic. FIG. 11 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 12:
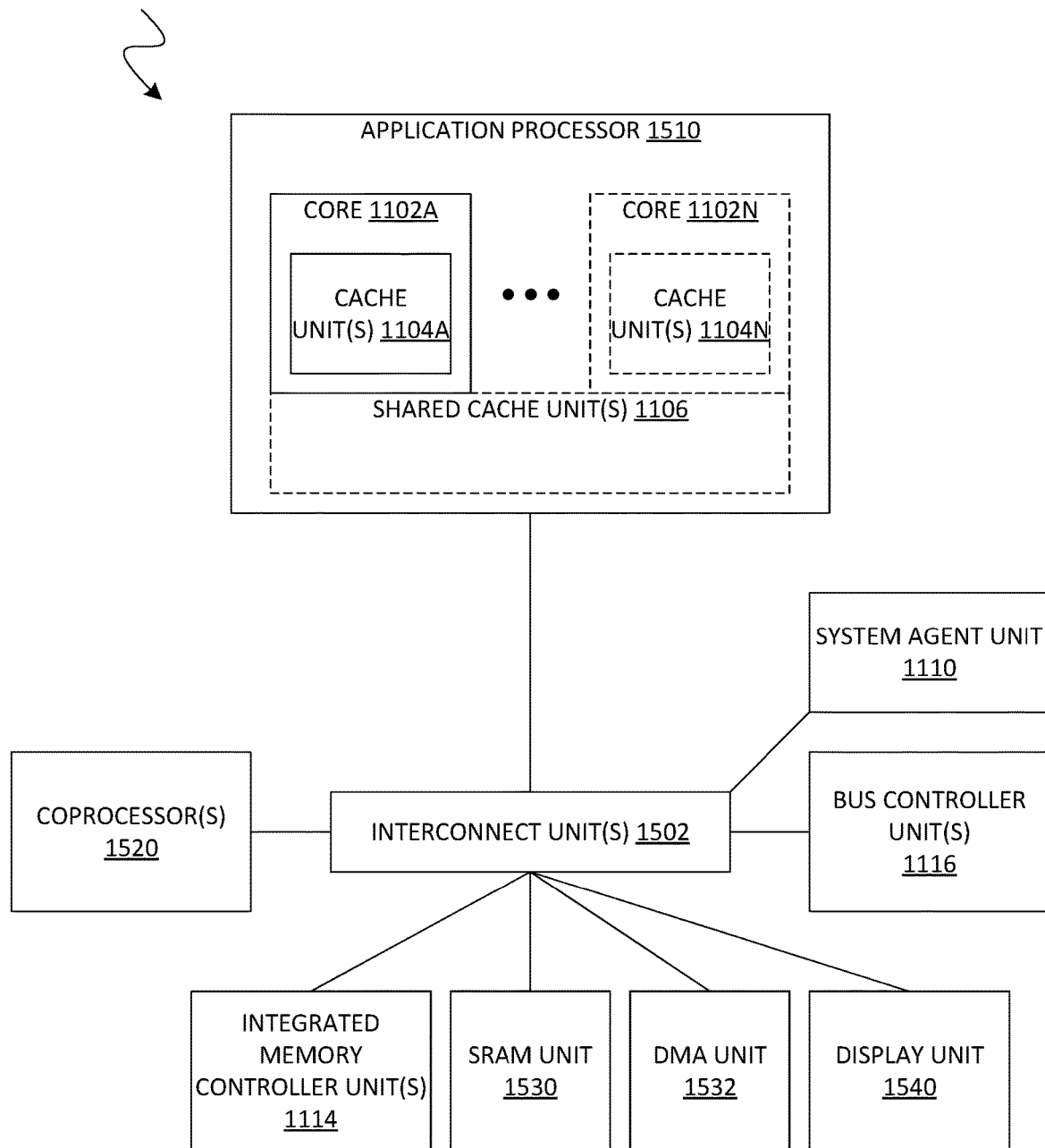

Referring now to FIG. 12, shown is a block diagram of a SoC 1500 in accordance with an embodiment of the present invention. Similar elements in FIG. 8 bear like reference numerals. Also, dashed lined boxes are optional features on more advanced SoCs. In FIG. 12, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
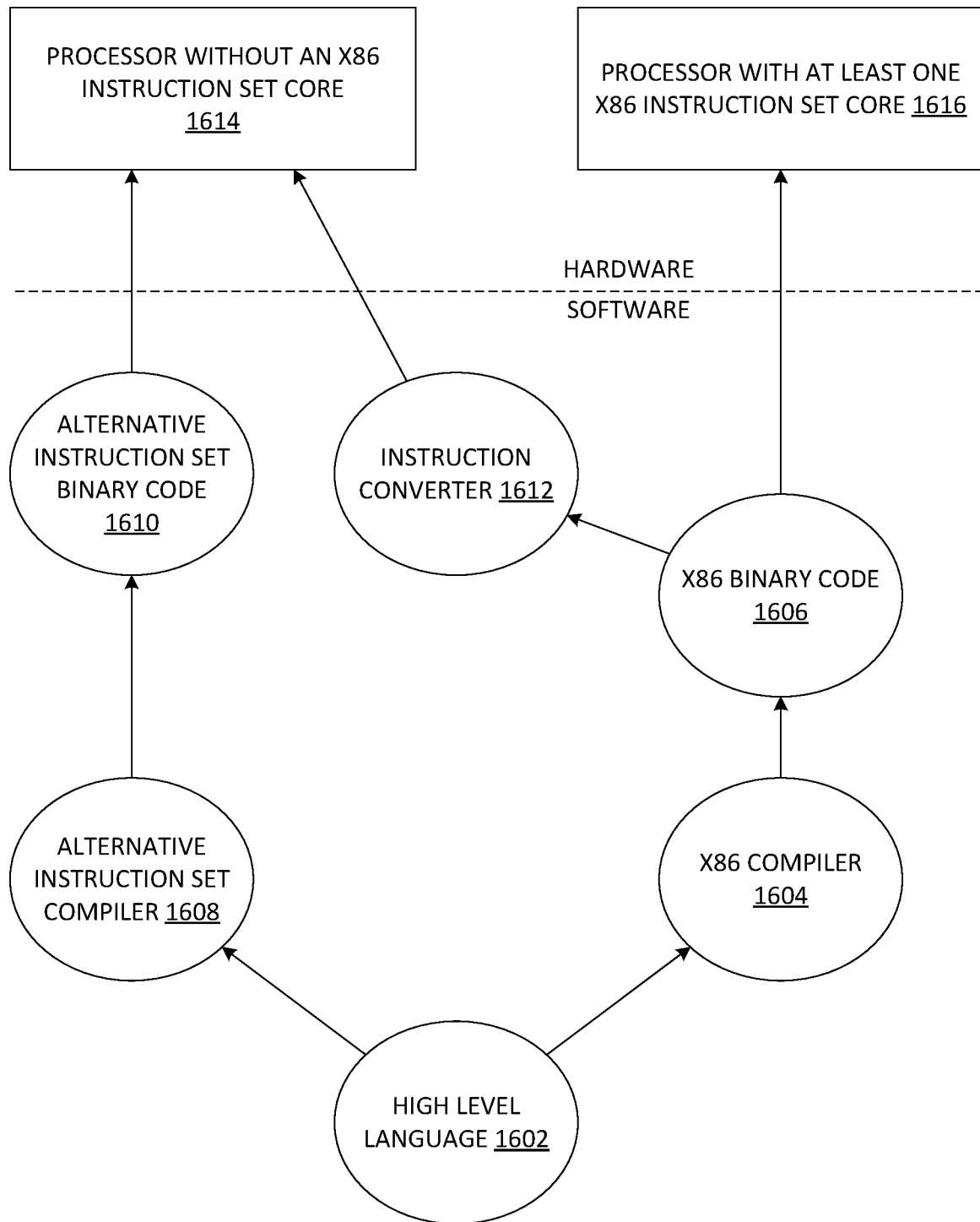
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 13 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Additional Notes and Examples

Example 1 includes an apparatus, comprising one or more fractional width fused multiply-accumulate (FMA) circuits configured as a shared Wallace tree, and circuitry coupled to the one or more fractional width FMA circuits to provide one or more fractional width FMA operations through the one or more fractional width FMA circuits.

Example 2 includes the apparatus of Example 1, wherein the one or more fractional width FMA circuits comprise two or more fractional width FMA circuits that together provide a full width FMA circuit.

Example 3 includes the apparatus of Example 2, wherein the two or more fractional width FMA circuits comprises a first set of cascaded carry-save adders (CSAs) that provide a first half-width FMA circuit, and a second set of cascaded CSAs that provide a second half-width FMA circuit.

Example 4 includes the apparatus of Example 3, wherein the circuitry is further to provide two half-width FMA operations per cycle.

Example 5 includes the apparatus of any of Examples 3 to 4, wherein the circuitry is further to provide half of a full width FMA operation per cycle.

Example 6 includes the apparatus of Example 5, wherein the circuitry is further to provide two passes through the first and second half-width FMA circuits to perform a full width FMA operation.

Example 7 includes the apparatus of any of Examples 5 to 6, further comprising a second pair of half-width FMA circuits coupled sequentially to the first and second half-width FMA circuits, wherein the circuitry is further to provide a full width FMA operation per cycle in a pipelined manner through the first and second half-width FMA circuits followed by the second pair of half-width FMA circuits.

Example 8 includes a method, comprising providing one or more fractional width fused multiply-accumulate (FMA) circuits configured as a shared Wallace tree, and providing one or more fractional width FMA operations through the one or more fractional width FMA circuits.

Example 9 includes the method of Example 8, wherein the one or more fractional width FMA circuits comprise two or more fractional width FMA circuits that together provide a full width FMA circuit.

Example 10 includes the method of any of Examples 8 to 9, further comprising providing two half-width FMA operations per cycle.

Example 11 includes the method of any of Examples 8 to 10, further comprising providing half of a full width FMA operation per cycle.

Example 12 includes the method of Example 11, further comprising providing two passes through a first pair of half-width FMA circuits to perform a full width FMA operation.

Example 13 includes the method of any of Examples 11 to 12, further comprising providing a second pair of half-width FMA circuits coupled sequentially to the first pair of half-width FMA circuits, and providing a full width FMA operation per cycle in a pipelined manner through the first pair of half-width FMA circuits followed by the second pair of half-width FMA circuits.

Example 14 includes the method of any of Examples 8 to 13, further comprising utilizing a systolic array of the one or more fractional width FMA circuits to support an associated large matrix to matrix multiplication.

Example 15 includes an apparatus, comprising a processor core, a memory, and a fused multiply-accumulate (FMA) unit coupled to the processor core and the memory, wherein the FMA unit comprises one or more fractional width FMA circuits configured as a shared Wallace tree, and wherein the FMA unit is to provide one or more fractional width FMA operations through the one or more fractional width FMA circuits.

Example 16 includes the apparatus of Example 15, wherein the one or more fractional width FMA circuits comprise two or more fractional width FMA circuits that together provide a full width FMA circuit.

Example 17 includes the apparatus of Example 16, wherein the two or more fractional width FMA circuits comprises a first set of cascaded carry-save adders (CSAs) that provide a first half-width FMA circuit, and a second set of cascaded CSAs that provide a second half-width FMA circuit.

Example 18 includes the apparatus of Example 17, wherein the FMA unit is further to provide two half-width FMA operations per cycle.

Example 19 includes the apparatus of any of Examples 17 to 18, wherein the FMA unit is further to provide half of a full width FMA operation per cycle.

Example 20 includes the apparatus of Example 19, wherein the FMA unit is further to provide two passes through the first and second half-width FMA circuits to perform a full width FMA operation.

Example 21 includes the apparatus of any of Examples 19 to 20, wherein the FMA unit further comprises a second pair of half-width FMA circuits coupled sequentially to the first and second half-width FMA circuits, and wherein the FMA unit is further to provide a full width FMA operation per cycle in a pipelined manner through the first and second half-width FMA circuits followed by the second pair of half-width FMA circuits.

Example 29 includes an apparatus, comprising means for providing one or more fractional width fused multiply-accumulate (FMA) circuits configured as a shared Wallace tree, and means for providing one or more fractional width FMA operations through the one or more fractional width FMA circuits.

Example 30 includes the apparatus of Example 29, wherein the one or more fractional width FMA circuits comprise two or more fractional width FMA circuits that together provide a full width FMA circuit.

Example 31 includes the apparatus of any of Examples 29 to 30, further comprising means for providing two half-width FMA operations per cycle.

Example 32 includes the apparatus of any of Examples 29 to 31, further comprising means for providing half of a full width FMA operation per cycle.

Example 33 includes the apparatus of Example 32, further comprising means for providing two passes through a first pair of half-width FMA circuits to perform a full width FMA operation.

Example 34 includes the apparatus of any of Examples 32 to 33, further comprising means for providing a second pair of half-width FMA circuits coupled sequentially to the first pair of half-width FMA circuits, and means for providing a full width FMA operation per cycle in a pipelined manner through the first pair of half-width FMA circuits followed by the second pair of half-width FMA circuits.

Example 35 includes the apparatus of any of Examples 29 to 34, further comprising means for utilizing a systolic array of the one or more fractional width FMA circuits to support an associated large matrix to matrix multiplication.

Example 36 includes an apparatus, comprising a processor core coupled to a memory, the processor core including a fused multiply-accumulate (FMA) unit, wherein the FMA unit comprises one or more fractional width FMA circuits configured as a shared Wallace tree, and wherein the FMA unit is to provide one or more fractional width FMA operations through the one or more fractional width FMA circuits.

Example 37 includes the apparatus of Example 36, wherein the one or more fractional width FMA circuits comprise two or more fractional width FMA circuits that together provide a full width FMA circuit.

Example 38 includes the apparatus of Example 37, wherein the two or more fractional width FMA circuits comprises a first set of cascaded carry-save adders (CSAs) that provide a first half-width FMA circuit, and a second set of cascaded CSAs that provide a second half-width FMA circuit.

Example 39 includes the apparatus of Example 38, wherein the FMA unit is further to provide two half-width FMA operations per cycle.

Example 40 includes the apparatus of any of Examples 38 to 39, wherein the FMA unit is further to provide half of a full width FMA operation per cycle.

Example 41 includes the apparatus of Example 40, wherein the FMA unit is further to provide two passes through the first and second half-width FMA circuits to perform a full width FMA operation.

Example 42 includes the apparatus of any of Examples 40 to 41, wherein the FMA unit further comprises a second pair of half-width FMA circuits coupled sequentially to the first and second half-width FMA circuits, and wherein the FMA unit is further to provide a full width FMA operation per cycle in a pipelined manner through the first and second half-width FMA circuits followed by the second pair of half-width FMA circuits.

Techniques and architectures for a FMA unit are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
   two or more fractional width fused multiply-accumulate (FMA) circuits configured as a shared Wallace tree comprising:
      multiple 3:2 carry-save adder (CSA) circuits comprising a first 3:2 CSA circuit, a second 3:2 CSA circuit, and a third 3:2 CSA circuit;
      a first 4:2 CSA circuit coupled to receive respective signals from the first 3:2 CSA circuit and the second 3:2 CSA circuit;
      a second 4:2 CSA circuit coupled to receive respective signals from the first 4:2 CSA circuit and the third 3:2 CSA circuit; and
      a multiplexer circuit coupled to selectively enable or prevent a communication of a carry signal between two of the multiple 3:2 CSA circuits; and
   circuitry coupled to the two or more fractional width FMA circuits to provide one or more fractional width FMA operations through the two or more fractional width FMA circuits.

2. The apparatus of claim 1, wherein the two or more fractional width FMA circuits support per-cycle operations of any of multiple different datatype widths.

3. The apparatus of claim 2, wherein the two or more fractional width FMA circuits comprises:
   a first set of cascaded carry-save adders (CSAs) that provide a first half-width FMA circuit; and
   a second set of cascaded CSAs that provide a second half-width FMA circuit.

4. The apparatus of claim 3, wherein the circuitry is further to:
   provide two half-width FMA operations per cycle.

5. The apparatus of claim 3, wherein the circuitry is further to:
   provide half of a full width FMA operation per cycle.

6. The apparatus of claim 5, wherein the circuitry is further to:
   provide two passes through the first and second half-width FMA circuits to perform the full width FMA operation.

7. The apparatus of claim 5, further comprising a second pair of half-width FMA circuits coupled sequentially to the first and second half-width FMA circuits, wherein the circuitry is further to:
   provide the full width FMA operation per cycle in a pipelined manner through the first and second half-width FMA circuits followed by the second pair of half-width FMA circuits.

8. A method, comprising:
   providing two or more fractional width fused multiply-accumulate (FMA) circuits configured as a shared Wallace tree comprising:
      multiple 3:2 carry-save adder (CSA) circuits comprising a first 3:2 CSA circuit, a second 3:2 CSA circuit, and a third 3:2 CSA circuit;
      a first 4:2 CSA circuit coupled to receive respective signals from the first 3:2 CSA circuit and the second 3:2 CSA circuit;
      a second 4:2 CSA circuit coupled to receive respective signals from the first 4:2 CSA circuit and the third 3:2 CSA circuit; and
      a multiplexer circuit coupled to selectively enable or prevent a communication of a carry signal between two of the multiple 3:2 CSA circuits; and
   providing one or more fractional width FMA operations through the two or more fractional width FMA circuits.

9. The method of claim 8, wherein the two or more fractional width FMA circuits support per-cycle operations of any of multiple different datatype widths.

10. The method of claim 8, further comprising:
    providing two half-width FMA operations per cycle.

11. The method of claim 8, further comprising:
    providing half of a full width FMA operation per cycle.

12. The method of claim 11, further comprising:
    providing two passes through a first pair of half-width FMA circuits to perform a full width FMA operation.

13. The method of claim 11, further comprising:
    providing a second pair of half-width FMA circuits coupled sequentially to the first pair of half-width FMA circuits; and
    providing the full width FMA operation per cycle in a pipelined manner through the first pair of half-width FMA circuits followed by the second pair of half-width FMA circuits.

14. The method of claim 8, further comprising:
    utilizing a systolic array of the one or more fractional width FMA circuits to support an associated matrix to matrix multiplication.

15. An apparatus, comprising:
a processor core;
a memory; and
a fused multiply-accumulate (FMA) unit coupled to the processor core and the memory, wherein the FMA unit comprises two or more fractional width FMA circuits configured as a shared Wallace tree comprising:
multiple 3:2 carry-save adder (CSA) circuits comprising a first 3:2 CSA circuit, a second 3:2 CSA circuit, and a third 3:2 CSA circuit;
a first 4:2 CSA circuit coupled to receive respective signals from the first 3:2 CSA circuit and the second 3:2 CSA circuit;
a second 4:2 CSA circuit coupled to receive respective signals from the first 4:2 CSA circuit and the third 3:2 CSA circuit; and
a multiplexer circuit coupled to selectively enable or prevent a communication of a carry signal between two of the multiple 3:2 CSA circuits;
wherein the FMA unit is to provide one or more fractional width FMA operations through the two or more fractional width FMA circuits.

16. The apparatus of claim 15, wherein the two or more fractional width FMA circuits support per-cycle operations of any of multiple different datatype widths.

17. The apparatus of claim 16, wherein the two or more fractional width FMA circuits comprises:
a first set of cascaded carry-save adders (CSAs) that provide a first half-width FMA circuit; and
a second set of cascaded CSAs that provide a second half-width FMA circuit.

18. The apparatus of claim 17, wherein the FMA unit is further to:
provide two half-width FMA operations per cycle.

19. The apparatus of claim 17, wherein the FMA unit is further to:
provide half of a full width FMA operation per cycle.

20. The apparatus of claim 19, wherein the FMA unit is further to:
provide two passes through the first and second half-width FMA circuits to perform the full width FMA operation.

21. The apparatus of claim 19, wherein the FMA unit further comprises a second pair of half-width FMA circuits coupled sequentially to the first and second half-width FMA circuits, and wherein the FMA unit is further to:
provide the full width FMA operation per cycle in a pipelined manner through the first and second half-width FMA circuits followed by the second pair of half-width FMA circuits.

* * * * *